US010126819B2

(12) United States Patent
Wakuda et al.

(10) Patent No.: US 10,126,819 B2
(45) Date of Patent: Nov. 13, 2018

(54) VIBRATION GENERATING DEVICE AND MANIPULATION FEELING IMPARTING INPUT DEVICE USING THE VIBRATION GENERATING DEVICE

(71) Applicant: Alps Electric Co., Ltd., Ota-ku, Tokyo (JP)

(72) Inventors: Hiroshi Wakuda, Miyagi-ken (JP); Takayuki Ito, Miyagi-ken (JP); Ayumu Anzai, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/827,962

(22) Filed: Nov. 30, 2017

(65) Prior Publication Data

US 2018/0095536 A1    Apr. 5, 2018

Related U.S. Application Data

(63) Continuation of application No. PCT/JP2016/066727, filed on Jun. 6, 2016.

(51) Int. Cl.
*G06F 3/01* (2006.01)
*B06B 1/04* (2006.01)
(Continued)

(52) U.S. Cl.
CPC .............. *G06F 3/016* (2013.01); *B06B 1/045* (2013.01); *G05G 1/02* (2013.01); *G05G 5/03* (2013.01);
(Continued)

(58) Field of Classification Search
CPC ........ G06F 3/016; H02K 33/02; H02K 33/16; B06B 1/045
(Continued)

(56) References Cited

U.S. PATENT DOCUMENTS 6,268,671 B1 * 7/2001 Furuki ................... H02K 33/02
310/15
6,487,300 B1 * 11/2002 Lee ......................... B06B 1/045
340/407.1
(Continued)

FOREIGN PATENT DOCUMENTS

| JP | 2002-149312 | 5/2002 |
| JP | 2003-340370 | 12/2003 |
| JP | 2005-214065 | 8/2005 |
| WO | 2012/067178 | 5/2012 |

OTHER PUBLICATIONS

International Search Report from International Application No. PCT/JP2016/066727 dated Aug. 2, 2016.

*Primary Examiner* — John A Tweel, Jr.
(74) *Attorney, Agent, or Firm* — Beyer Law Group LLP

(57) ABSTRACT

A vibration generating device has a vibration generating member that causes vibration in a vibration direction, a vibration transmitting member, and a base body. The vibration generating member has a first yoke and a second yoke spaced in the vibration direction so as to face each other, a coil that generates magnetism, and a support body that supports the first yoke. A first gap is formed between the first vibration-side opposite surface of the first yoke and the second vibration-side opposite surface of the second yoke; these surfaces face each other in the vibration direction. A second gap is formed between the first orthogonal-side opposite surface of the first yoke and the second orthogonal-side opposite surface of the second yoke; these surfaces face each other in an orthogonal direction orthogonal to the vibration direction. The first gap is narrower than the second gap.

9 Claims, 11 Drawing Sheets

(51) Int. Cl.
  *H02K 33/02* (2006.01)
  *H02K 33/16* (2006.01)
  *G05G 1/02* (2006.01)
  *G05G 5/03* (2008.04)
  *G06F 3/041* (2006.01)
  *G06F 3/044* (2006.01)
  *G06F 3/0354* (2013.01)

(52) U.S. Cl.
  CPC .......... *G06F 3/03547* (2013.01); *G06F 3/041* (2013.01); *G06F 3/044* (2013.01); *H02K 33/02* (2013.01); *H02K 33/16* (2013.01)

(58) Field of Classification Search
  USPC ...................................................... 340/407.2
  See application file for complete search history.

(56) References Cited

U.S. PATENT DOCUMENTS

| | | | | |
|---|---|---|---|---|
| 6,816,049 | B2* | 11/2004 | Watanabe | G06F 3/016 335/222 |
| 7,292,227 | B2* | 11/2007 | Fukumoto | G01C 21/3664 178/18.04 |
| 7,292,695 | B2* | 11/2007 | Kobayashi | H04R 9/10 381/151 |
| 8,581,451 | B2* | 11/2013 | Yun | H02K 33/16 310/12.16 |
| 9,172,291 | B2* | 10/2015 | Cardon | H02K 33/02 |
| 10,042,437 | B2* | 8/2018 | Hisatsugu | G06F 3/0338 |
| 2002/0149561 | A1 | 10/2002 | Fukumoto et al. | |
| 2005/0254672 | A1 | 11/2005 | Kobayashi | |

* cited by examiner

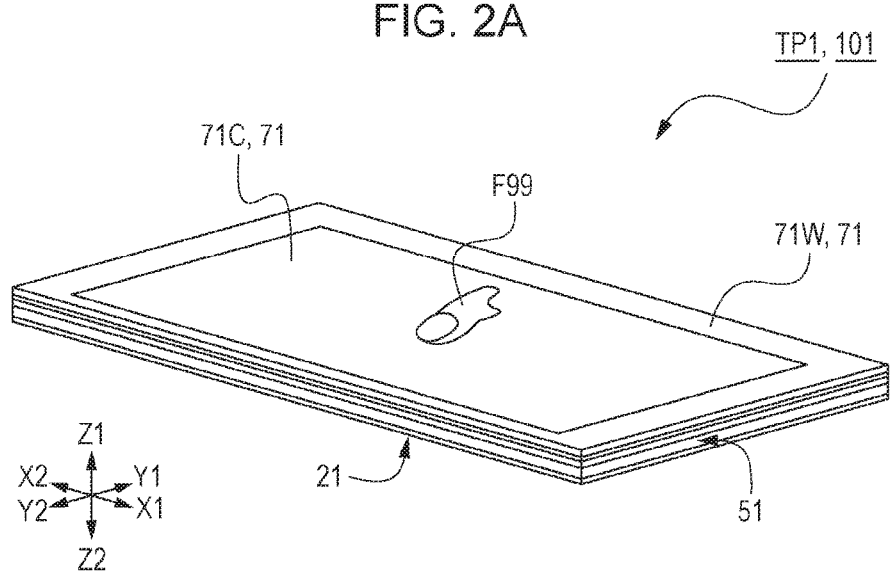
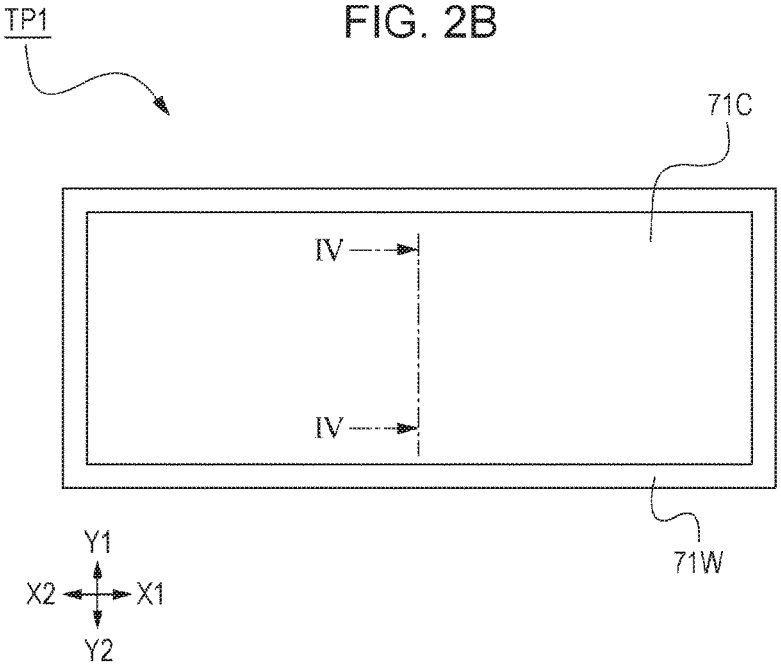

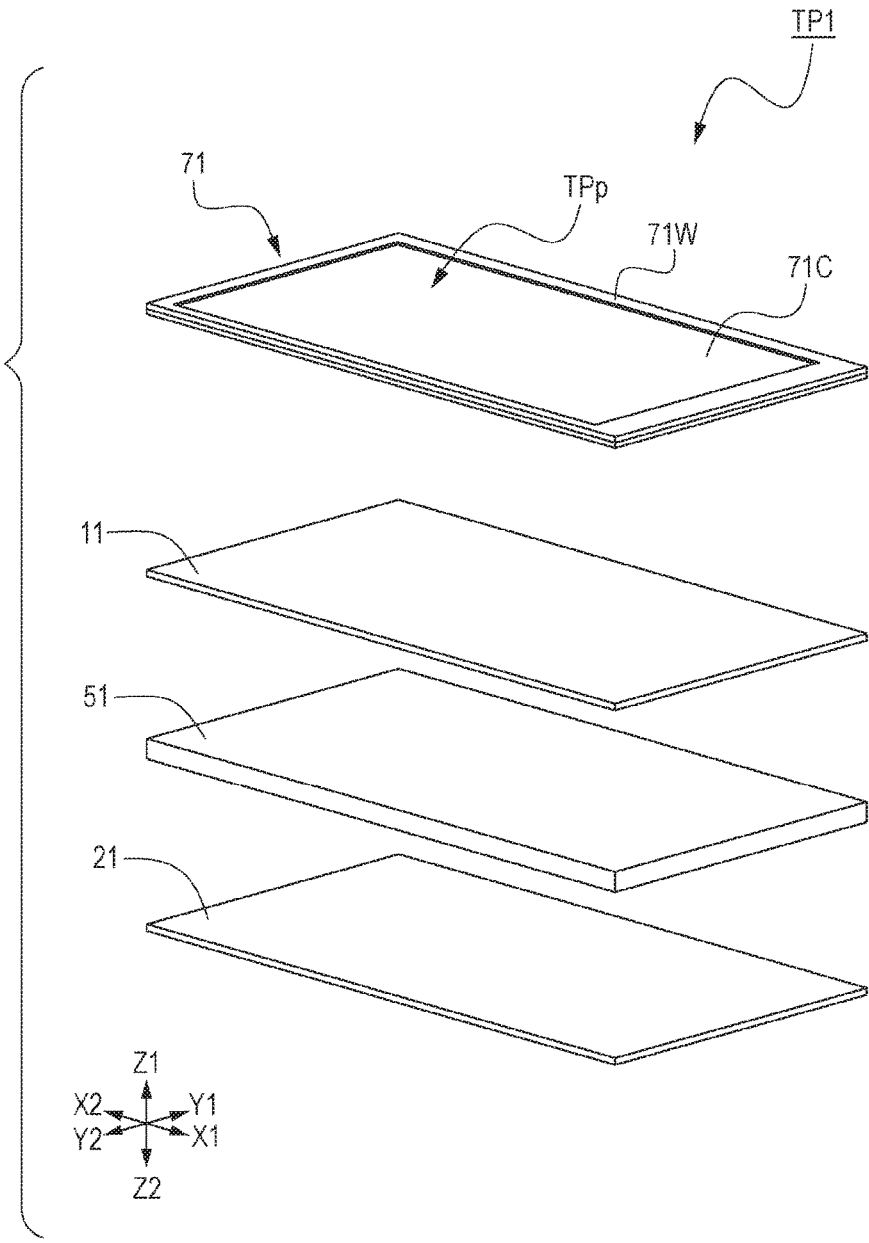

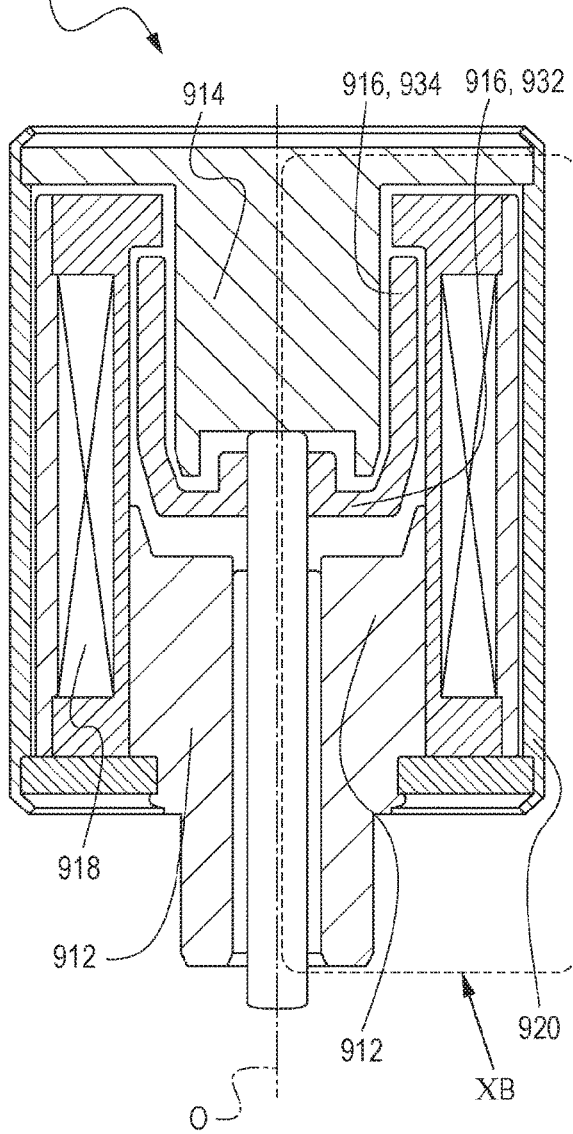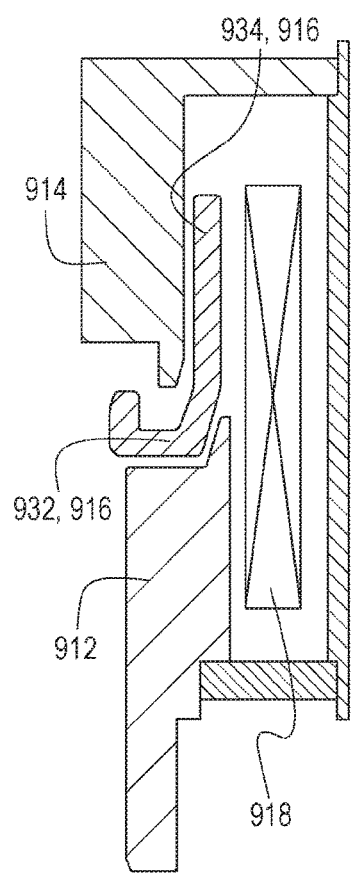

VIBRATION GENERATING DEVICE AND MANIPULATION FEELING IMPARTING INPUT DEVICE USING THE VIBRATION GENERATING DEVICE

CLAIM OF PRIORITY

This application is a Continuation of International Application No. PCT/JP2016/066727 filed on Jun. 6, 2016, which claims benefit of Japanese Patent Application No. 2015-146341 filed on Jul. 24, 2015. The entire contents of each application noted above are hereby incorporated by reference.

BACKGROUND OF THE INVENTION

1. Field of the Invention

The present invention relates to a vibration generating device used in various types of electronic units and to an input device that uses the vibration generating device.

2. Description of the Related Art

In the electronic unit field, input devices such as touch panels and touch pads have been frequently used in recent years. This input device is such that when a manipulator (user) brings a fingertip into contact with the manipulation surface, the input device detects the coordinate position of the fingertip on the manipulation surface according to a change in a capacitance value or the like and enables an input manipulation matching the coordinate position. For example, this type of input device is installed on the front surface of a display device such as a liquid crystal display (LCD). When the user places a fingertip on a desired manipulation area displayed on the screen of the display device, manipulation contents of the manipulation area are executed.

With this type of input device, when the user manipulates the input device by bringing the user's fingertip into contact with the manipulation surface, a difference in sense transmitted to the fingertip does not occur between before and after the manipulation (input), so the user has not been able to obtain a manipulation sense (manipulation feeling). In view of this, a feeling stimulus generating device that gives a feeling stimulus (feeling feedback) to the user's fingertip has been conventionally proposed, and there has been a case in which an input device is used in combination with this feeling stimulus generating device. As a typical example of this feeling stimulus generating device, a type of stimulus generating device that gives vibration to impart a feeling stimulus is most used.

As this vibration type of feeling stimulus generating device, International Publication No. WO2012/067178 proposes an electromagnetic actuator 900 as illustrated in FIGS. 10A, 10B, 11A and 11B. FIGS. 10A and 10B illustrate the electromagnetic actuator 900 in a conventional example. FIG. 10A is a schematic longitudinal cross-sectional view, and FIG. 10B is a structural diagram on which the main constituent components (actuator portion) of a portion XB indicated in FIG. 10A are extracted. FIGS. 11A and 11B illustrate magnetic path analysis results indicating the effect of the actuator portion indicated in FIG. 10B; FIG. 11A is a magnetic flux line diagram in an initial state, and FIG. 11B is a magnetic flux line diagram in a state in which a current is supplied to a coil 918.

The electromagnetic actuator 900 indicated in FIGS. 10A and 10B has: a first fixed iron core 912 and a second fixed iron core 914, which are disposed opposite to each other with a predetermined gap interposed in the direction of an axial line O; a movable iron core 916 disposed so as to be movable along the axial line O in the vicinity of this gap; and a coil 918 that exerts magnetic fields around the two fixed iron cores (first fixed iron core 912 and second fixed iron core 914) and the movable iron core 916 to form magnetic paths in them and move the movable iron core 916 along the axial line O. Basically, these members are formed in a rotationally symmetrical form, that is, in a circular form, and are accommodated in a cylindrical housing 920.

With the electromagnetic actuator 900, when a current is supplied to the coil 918 in an initial state indicated in FIG. 11A, a magnetic attractive force is generated for the movable iron core 916 from each of the two fixed iron cores (first fixed iron core 912 and second fixed iron core 914). At this time, the second fixed iron core 914 and a magnetic flux inducing part 934, extending in the direction of the axial line O, of the movable iron core 916 mainly undertake an effect of inducing a magnetic flux, and the first fixed iron core 912 and a magnetic flux action part 932, extending in a direction crossing the axial line O, of the movable iron core 916 mainly undertake an attraction effect. Due to this, the magnetic attractive force on the same side as the first fixed iron core 912 is larger than the magnetic attractive force on the same side as the second fixed iron core 914. Therefore, when a current is supplied, the movable iron core 916 moves toward the first fixed iron core 912 and enters a state indicated in FIG. 11B. Due to the movement of the movable iron core 916 at this time, vibration is generated.

SUMMARY OF THE INVENTION

In the conventional example, however, in the initial state in which no magnetic attractive force is generated, a gap between the second fixed iron core 914 and the magnetic flux inducing part 934, in which it is desirable to suppress a magnetic attractive force, is narrower than a gap between the first fixed iron core 912 and the magnetic flux action part 932, in which it is desirable to generate a magnetic attractive force. Therefore, the structure of the electromagnetic actuator 900 is not such that a strong magnetic attractive force is generated between the first fixed iron core 912 and the movable iron core 916. Furthermore, when a current is supplied and the movable iron core 916 moves toward the first fixed iron core 912, the opposite areas of the second fixed iron core 914 and magnetic flux inducing part 934 are reduced and the magnetic resistance is increased. Therefore, the magnetic attractive force between the first fixed iron core 912 and movable iron core 916 is reduced by an amount by which the magnetic resistance is increased.

Due to this, in the conventional example, there has been the problem that unless much more current is supplied to the coil 918 to generate a large magnetic field, the movable iron core 916 cannot be moved faster and stronger vibration cannot thereby be obtained. In the arrangement as in the conventional example, if much more current is supplied to the coil 918 to generate a large magnetic filed, attraction between the second fixed iron core 914 and the magnetic flux inducing part 934 is increased and vibration in an undesired direction is generated. In some cases, there has been the risk that an abutting sound (contact noise) is generated due to a contact between the second fixed iron core 914 and the movable iron core 916.

The present invention addresses the problem described above by providing a vibration generating device that gives a stronger manipulation feeling and a vibration generating device that uses the vibration generating device.

To solve this problem, in a vibration generating device that has a vibration generating member having a movable part operable in a vibration direction, a vibration transmitting member connected to the movable part, and a base body that holds the vibration generating member, the vibration generating device in the present invention is characterized in that: the vibration generating member has a first yoke and a second yoke that are placed so as to be spaced in the vibration direction, a coil that is placed in the vicinity of at least one of the first yoke and the second yoke and generates magnetism, and a support body that supports the first yoke so as to be movable in the vibration direction; the first yoke has a first vibration-side opposite surface and the second yoke has a second vibration-side opposite surface, the first vibration-side opposite surface and the second vibration-side opposite surface facing each other in the vibration direction; the first yoke has a first orthogonal-side opposite surface and the second yoke has a second orthogonal-side opposite surface, the first orthogonal-side opposite surface and the second orthogonal-side opposite surface facing each other in an orthogonal direction orthogonal to the vibration direction; and a first gap between the first vibration-side opposite surface and the second vibration-side opposite surface is narrower than a second gap between the first orthogonal-side opposite surface and the second orthogonal-side opposite surface.

According to this, with the vibration generating device in the present invention, when a current is supplied to the coil, a magnetic attractive force between the first yoke and the second yoke in the first gap becomes strong. Therefore, the first yoke moves faster toward the second yoke in the vibration direction in the first gap, so the first yoke vibrates in the vibration direction. Accordingly, it is possible for the vibration transmitting member to give stronger vibration in the vibration direction through the movable part, which is operable in the vibration direction. Therefore, it is possible to provide a vibration generating device that can give a stronger manipulation feeling without having to supply much more current to the coil to generate a large magnetic field.

The vibration generating device in the present invention is characterized in that, in an initial state in which no magnetic attractive force is generated, the opposite areas of the first orthogonal-side opposite surface and second orthogonal-side opposite surface are preferably larger than the opposite areas of the first vibration-side opposite surface and second vibration-side opposite surface.

According to this, when a current is supplied to the coil, a magnetic resistance (the ease with which a magnetic flux flows) caused in the second gap in the magnetic circuit formed from the first yoke and second yoke can be reduced. Therefore, a magnetic resistance in the entire magnetic circuit can be reduced and the magnetic attractive force between the first yoke and the second yoke in the vibration direction (in the first gap) can thereby be made stronger. Thus, the first yoke moves even faster toward the second yoke in the vibration direction. Therefore, it is possible for the vibration transmitting member to give even stronger vibration in the vibration direction through the movable part, which is operable in the vibration direction.

The vibration generating device in the present invention is characterized in that when a magnetic attractive force is generated, the opposite areas of the first orthogonal-side opposite surface and the second orthogonal-side opposite surface are preferably increased.

According to this, the area of a portion that has an effect of mainly inducing a magnetic flux is increased. Therefore, the magnetic resistance in this portion is reduced in contrary to the fact that the opposite areas of the second fixed iron core and magnetic flux inducing part are reduced and the magnetic resistance is thereby increased as in the conventional example. Thus, the magnetic attractive force between the first yoke and the second yoke in the first gap becomes even stronger, making it possible to give even stronger vibration.

A manipulation feeling imparting input device in the present invention is characterized by having the vibration generating device described above and an input unit connected to the vibration transmitting member in the vibration generating device, the input unit being manipulated by a specific body region such as a user's fingertip. The manipulation feeling imparting input device is also characterized in that the input unit has a manipulation surface that is manipulated and a control unit that processes input information manipulated on the manipulation surface and outputs the processed information and that when the manipulation surface is manipulated, vibration is imparted to the input unit.

According to this, when the manipulation surface of the input unit is manipulated, strong vibration is given to the input unit. Therefore, it is possible to provide the manipulation feeling imparting input device with which a stronger manipulation feeling is imparted without having to supply much more current to the coil to generate a large magnetic field.

The manipulation feeling imparting input device in the present invention is characterized in that the input unit is preferably connected integrally to the vibration transmitting member.

According to this, vibration generated by the vibration generating device is efficiently transmitted directly to the input unit. Thus, an even stronger manipulation feeling is imparted.

With the vibration generating device in the present invention, when a current is supplied to the coil, a magnetic attractive force between the first yoke and the second yoke in the first gap becomes strong. Therefore, the first yoke moves faster toward the second yoke in the vibration direction in the first gap, so the first yoke vibrates in the vibration direction. Accordingly, it is possible for the vibration transmitting member to give stronger vibration in the vibration direction through the movable part, which is operable in the vibration direction. Therefore, it is possible to provide a vibration generating device that can give a stronger manipulation feeling without having to supply much more current to the coil to generate a large magnetic field.

The manipulation feeling imparting input device in the present invention can give strong vibration to an input unit when the manipulation surface of the input unit is manipulated. Therefore, it is possible to provide a manipulation feeling imparting input device with which a stronger manipulation feeling is imparted having to supply much more current to the coil to generate a large magnetic field.

BRIEF DESCRIPTION OF THE DRAWINGS

FIGS. 2A and 2B each are a structural diagram illustrating an input unit included in the manipulation feeling imparting input device according to the first embodiment of the present invention, FIG. 2A being a perspective view of the input unit, FIG. 2B being a top view as viewed from the Z1 side indicated in FIG. 2A;

FIG. 3 is an exploded perspective view of the input unit according to the first embodiment of the present invention;

FIGS. 10A and 10B illustrate an electromagnetic actuator in a conventional example, FIG. 10A being a schematic longitudinal cross-sectional view, FIG. 10B is a structural diagram on which the main constituent components (actuator portion) of a portion XB indicated in FIG. 10A are extracted.

DESCRIPTION OF THE PREFERRED EMBODIMENT

Figure 1:
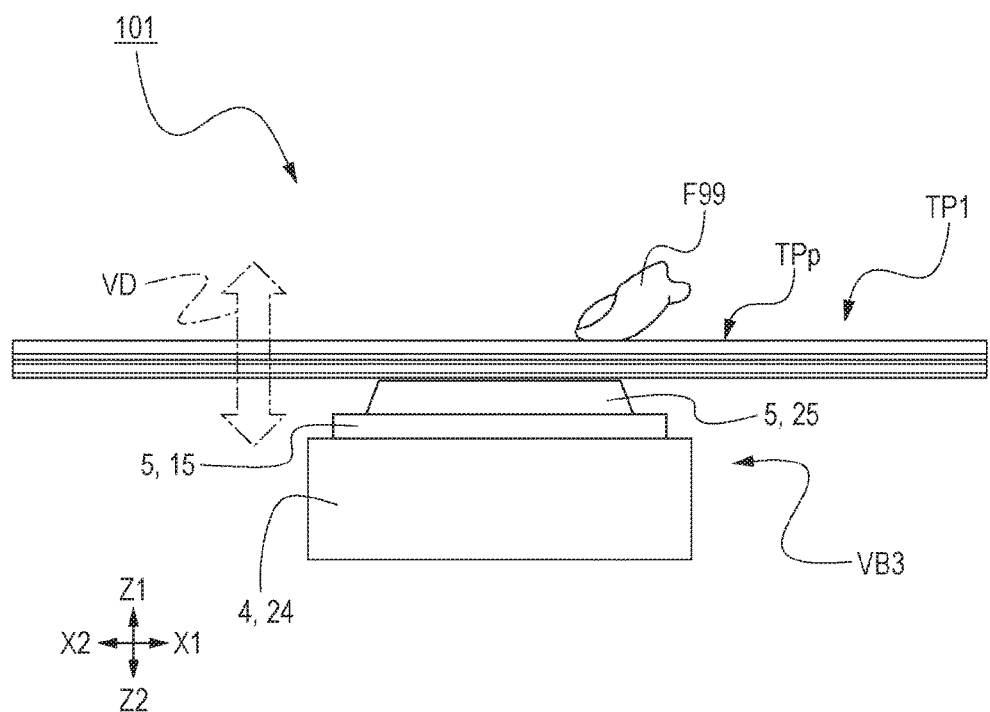
FIG. 1 is a side-surface structural diagram illustrating a manipulation feeling imparting input device in a first embodiment of the present invention.

An embodiment of the present invention will be described below with reference to the drawings.
First Embodiment In the first embodiment of the present invention, a vibration generating device VB3 and a manipulation feeling imparting input device 101 that uses the vibration generating device VB3 will be described. First, the manipulation feeling imparting input device 101 will be described. FIG. 1 is a side-surface structural diagram illustrating the manipulation feeling imparting input device 101 that uses the vibration generating device VB3 according to the first embodiment of the present invention.

As indicated in FIG. 1, the manipulation feeling imparting input device 101 in the first embodiment of the present invention includes an input unit TP1 that has a manipulation surface TPp manipulated by a specific body region F99 such as a user's fingertip, and also includes a vibration generating device VB3 in the first embodiment of the present invention. The input unit TP1 is connected to the vibration generating device VB3 so that vibration generated by the vibration generating device VB3 is imparted to the input unit TP1.

Figure 4:
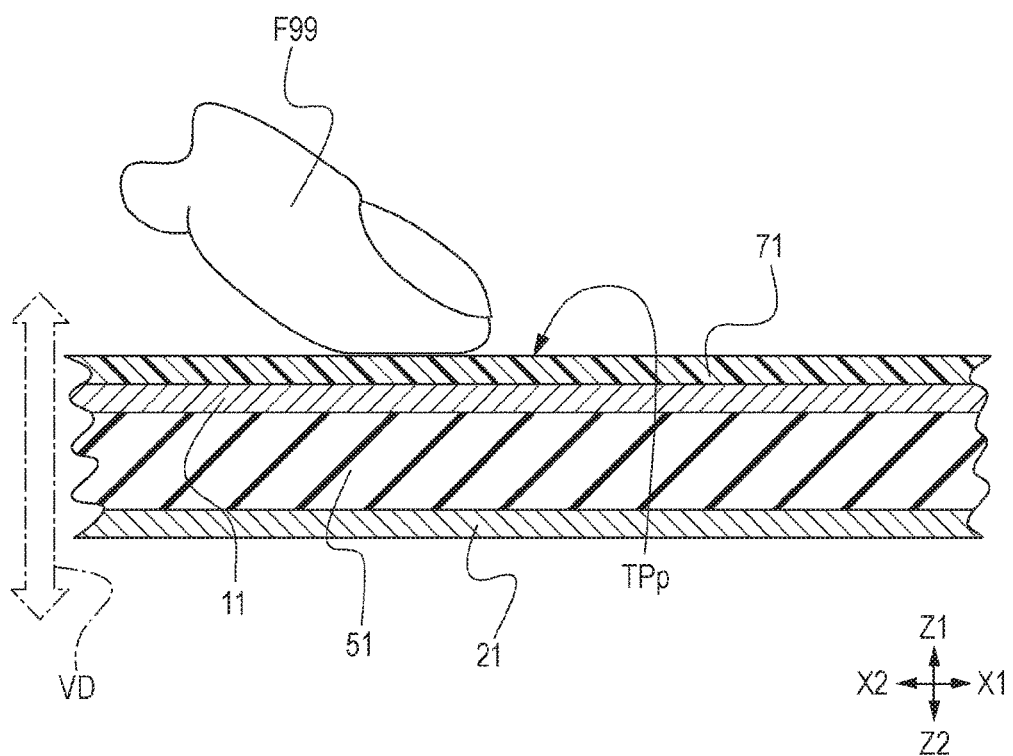
FIG. 4 is a structural diagram illustrating the input unit according to the first embodiment of the present invention, the diagram being a cross sectional view taken along line IV-IV indicated in FIG. 2B.

First, the input unit TP1 of the manipulation feeling imparting input device 101 will be described. FIGS. 2A and 2B each are a structural diagram illustrating the input unit TP1 according to the first embodiment of the present invention; FIG. 2A is a perspective view of the input unit TP1, and FIG. 2B is a top view as viewed from the Z1 side indicated in FIG. 2A. FIG. 3 is an exploded perspective view of the input unit TP1 according to the first embodiment of the present invention. FIG. 4 is a structural diagram illustrating the input unit TP1 according to the first embodiment of the present invention, the diagram being a cross sectional view taken along line IV-IV illustrated in FIG. 2B.

The input unit TP1 uses a so-called touch pad that can detect the coordinate position of the specific body region F99 (referred to be below as the fingertip), which is the user's finger tip. This input unit TP1 (touch pad) is of a detection method type called a capacitive type. When the user brings the user's fingertip close to or into contact with the manipulation surface TPp, the input unit TP1 detects the coordinate position, on the manipulation surface TPp, of the fingertip according to a change in a capacitance value, and outputs input information matching the coordinate position of the fingertip.

The input unit TP1 is connected to the vibration generating device VB3. Specifically, the input unit TP1 is placed on a vibration transmitting member 5, which will be specifically described later, included in the vibration generating device VB3 (see FIG. 1). When the user performs an input manipulation, vibration is imparted from the vibration generating device VB3 to the input unit TP1.

Next, the structure of the input unit TP1 will be described in detail. As illustrated in FIGS. 2A and 2B, the input unit TP1 is shaped like a sheet as a whole. As illustrated in FIGS. 3 and 4, the input unit TP1 includes an insulating board 51 made of an epoxy resin including a glass filler, an X-coordinate detection layer 11 laminated on one surface (on the same side as the Z1 direction illustrated in FIG. 3) of the insulating board 51, a Y-coordinate detection layer 21 laminated on the other surface (on the same side as the Z2 direction illustrated in FIG. 3) of the insulating board 51, a top cover 71 that covers the X-coordinate detection layer 11, and a capacitance detecting part 91 (see FIG. 6), not illustrated in FIGS. 3 and 4, that detects capacitances in the X-coordinate detection layer 11 and Y-coordinate detection layer 21.

The insulating board 51, X-coordinate detection layer 11, and Y-coordinate detection layer 21 of the input unit TP1 are manufactured by using a so-called double-sided printed wiring board (PWB). That is, a copper foil on one surface of the double-sided PWB is patterned to form the X-coordinate detection layer 11, and a copper foil on the other surface is patterned to form the Y-coordinate detection layer 21. The X-coordinate detection layer 11 and Y-coordinate detection layer 21 cooperate with each other to detect coordinates at which a fingertip is positioned.

Although not illustrated in detail, many first electrodes in a strip shape are placed on the X-coordinate detection layer 11 of the input unit TP1. These first electrodes are equally distributed, forming a first detection electrode group. A plurality of first electrodes in the first detection electrode group are arranged and linked in one row in the Y direction. First detection electrode rows are distributed in the X direction so as to be equally spaced. Therefore, it is possible to detect the fingertip's X coordinate on the manipulation surface TPp, according to detection data indicating the row that includes a first electrode interacting with the user's fingertip.

Many second electrodes in a strip shape are placed on the Y-coordinate detection layer 21 of the input unit TP1 as with the X-coordinate detection layer 11. These second electrodes are equally distributed, forming a second detection electrode group. A plurality of second electrodes in the second detection electrode group are arranged and linked in one row in the X direction. Second detection electrode rows are distributed in the Y direction in a distributed manner so as to be equally spaced. Therefore, it is possible to detect the fingertip's Y coordinate on the manipulation surface TPp, according to detection data indicating the row that includes a second electrode interacting with the user's fingertip. Although detailed descriptions of the detection principle of the touch pad will be omitted because the principle is known, when the user brings a fingertip close to or into contact with the manipulation surface TPp, the value of a capacitance between the first electrode and the second electrode changes in the vicinity of the fingertip. Therefore, the coordinate position of the fingertip can be detected according to this change in the capacitance value.

As illustrated in FIG. 3, the top cover 71 of the input unit TP1 includes a cover sheet 71C having the manipulation surface TPp, to which the user's fingertip is brought close or with which it is brought into contact, and also includes a cover frame 71W, in an elongated frame shape, that covers the outer circumferential edge of the cover sheet 71C. The cover sheet 71C is manufactured from a polyethylene terephthalate (PET) sheet, which is a general film base material. The cover frame 71W is manufactured by injecting an acrylonitrile butadiene styrene copolymer (ABS) resin. The cover sheet 71C and cover frame 71W are bonded to each other with an adhesive such as a double-sided tape. The top cover 71 is bonded to the cover the X-coordinate detection layer 11 so as to cover it.

The capacitance detecting part 91 in the input unit TP1 is mounted on the wiring board 90 (see FIG. 6), which will be described later. The capacitance detecting part 91, which has an integrated circuit having a capacitance detection circuit, detects capacitances between the X-coordinate detection layer 11 and a finger (specific body region F99) and between the Y-coordinate detection layer 21 and the finger. The capacitance detecting part 91, which has a control unit having a control circuit in an integrated circuit, outputs detection results of the detected capacitances to an external unit. Connections between the X-coordinate detection layer 11 and the capacitance detecting part 91 and between the Y-coordinate detection layer 21 and the capacitance detecting part 91 are established with flexible printed circuits (FPC), which are not illustrated.

Figure 5:
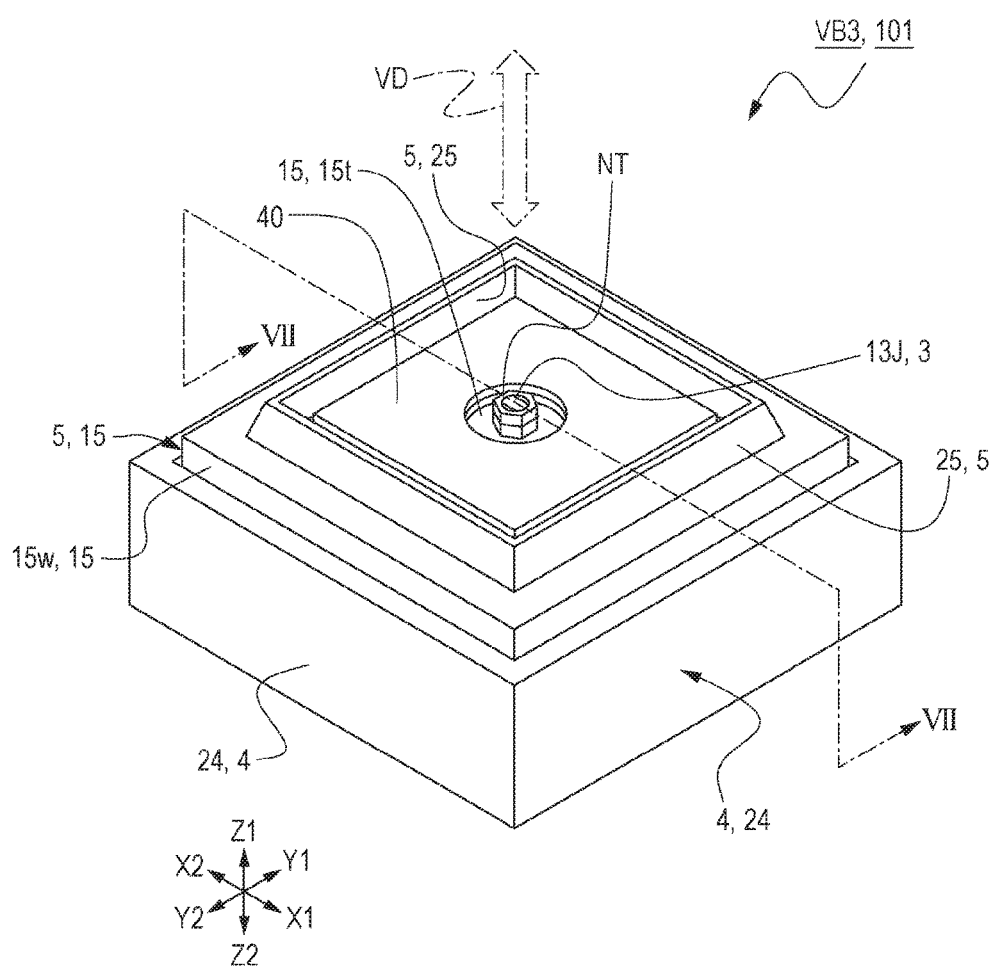
FIG. 5 is a perspective view of a vibration generating device in the manipulation feeling imparting input device according to the first embodiment of the present invention.
Figure 6:
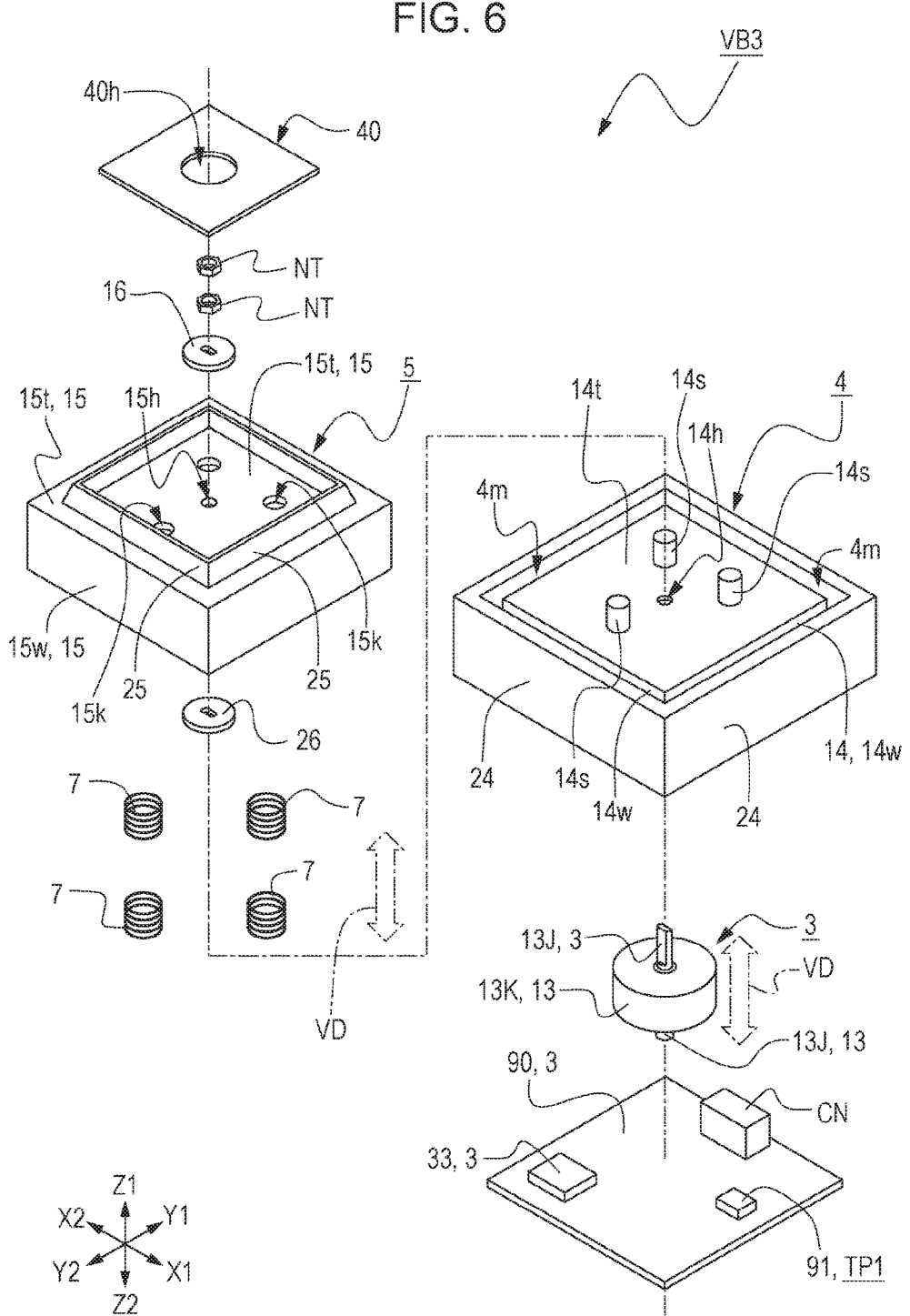
FIG. 6 is an exploded perspective view of the vibration generating device according to the first embodiment of the present invention.
Figure 7:
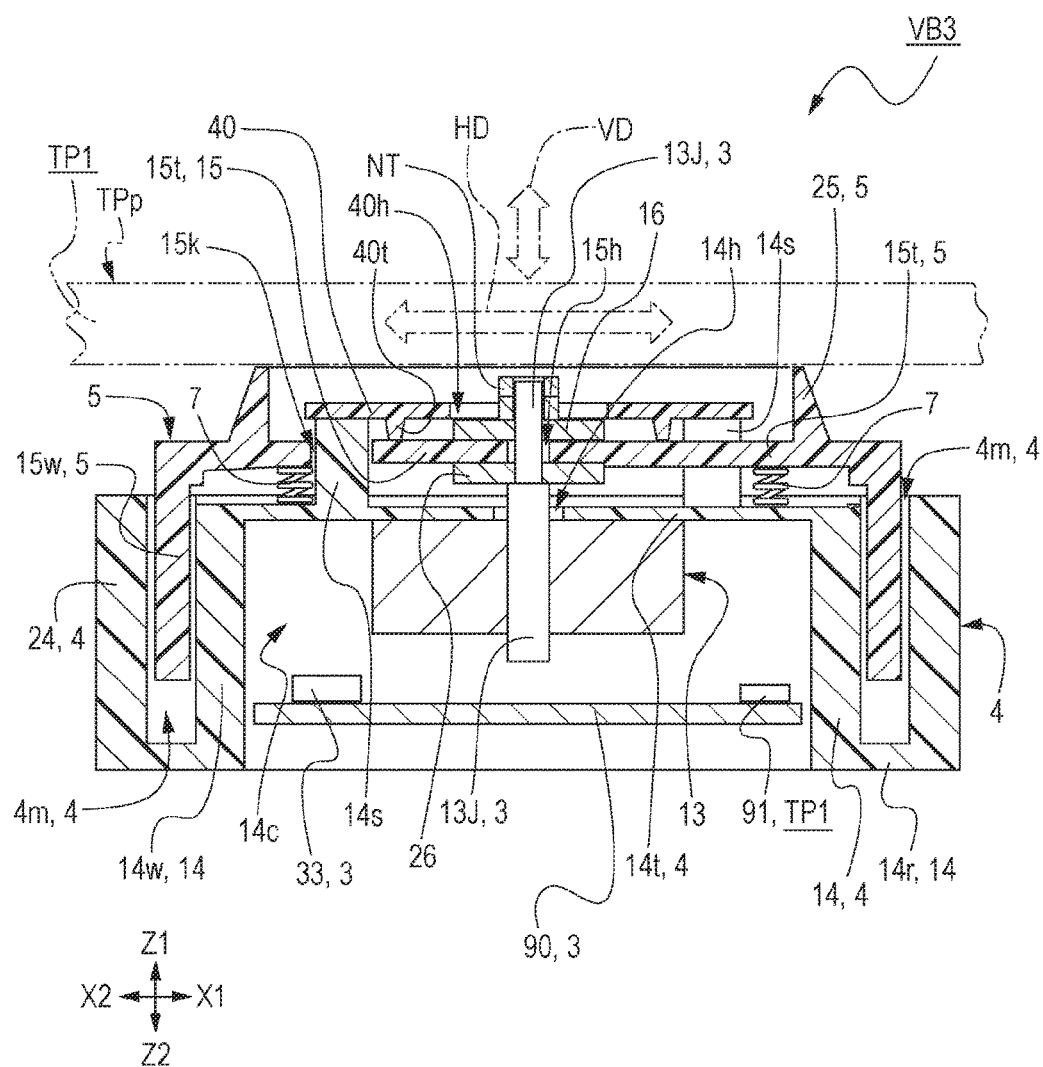
FIG. 7 illustrates the vibration generating device according to the first embodiment of the present invention, the drawing being a longitudinal cross-sectional view taken along line VII-VII indicated in FIG. 5.

Next, the vibration generating device VB3 in the first embodiment of the present invention, which is included in the manipulation feeling imparting input device 101, will be described. FIG. 5 is a perspective view of the vibration generating device VB3 in the manipulation feeling imparting input device 101 according to the first embodiment of the present invention. FIG. 6 is an exploded perspective view of the vibration generating device VB3. FIG. 7 is a longitudinal cross-sectional view of the vibration generating device VB3 as taken along line VII-VII illustrated in FIG. 5. In FIG. 7, the cross-section of a vibrating body 13 in a vibration generating member 3 is simplified. The cross-section of the vibrating body 13 will be illustrated in detail in FIGS. 8A and 8B, which will be referenced later.

The vibration generating device VB3 has a box-like outside shape as illustrated in FIG. 5. As illustrated in FIGS. 6 and 7, the vibration generating device VB3 includes the vibration generating member 3 that has a movable part 13J operable in a vibration direction VD (Z direction indicated in FIG. 5), a base body 4 that holds the vibration generating member 3, and the vibration transmitting member 5 connected to the movable part 13J. In addition, in the first embodiment of the present invention, the vibration generating device VB3 has urging members 7 (see FIG. 7) that urge the vibration generating member 3 and vibration transmitting member 5 in directions away from each other, a top plate member 40 fixed to the base body 4, and the wiring board 90 on which the capacitance detecting part 91 of the input unit TP1 is mounted, as indicated in FIG. 6. With the input unit TP1 placed on (connected to) the vibration transmitting member 5, the vibration generating device VB3 can drive the vibration generating member 3 in response to a touch manipulation performed on the input unit TP1 by the user, and can transmit (impart) vibration to the user. Thus, even if a device cannot easily provide a manipulation sense, the vibration generating device VB3 can give a manipulation sense, that is, a vibration feedback feeling, to the user.

Figure 8A:
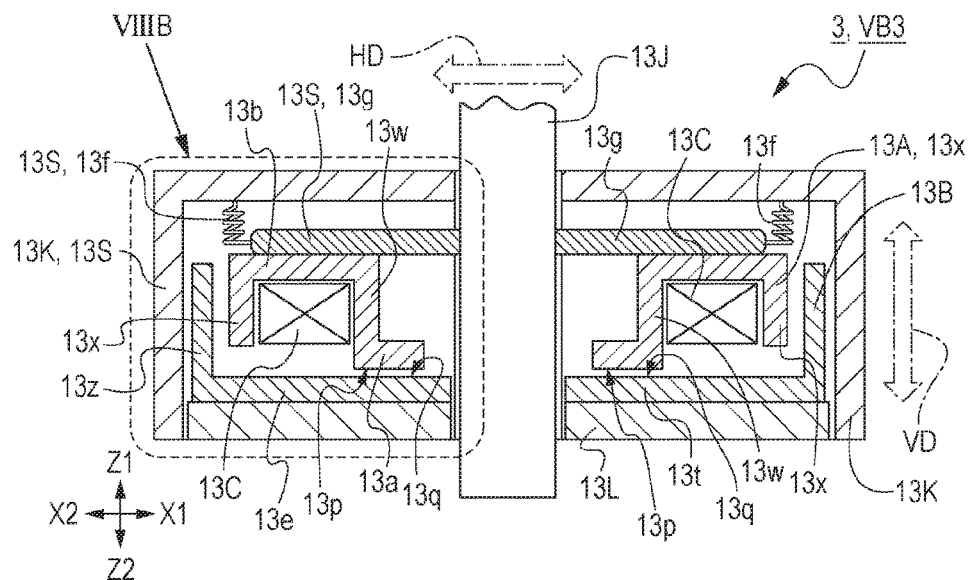
FIGS. 8A and 8B schematically illustrate a vibration generating member included in the vibration generating device according to the first embodiment of the present invention, FIG. 8A being a longitudinal cross-sectional view of a vibrating body included in the vibration generating member illustrated in FIG. 7, FIG. 8B being an enlarged view of a portion IIIVB indicated in FIG. 8A.
Figure 8B:
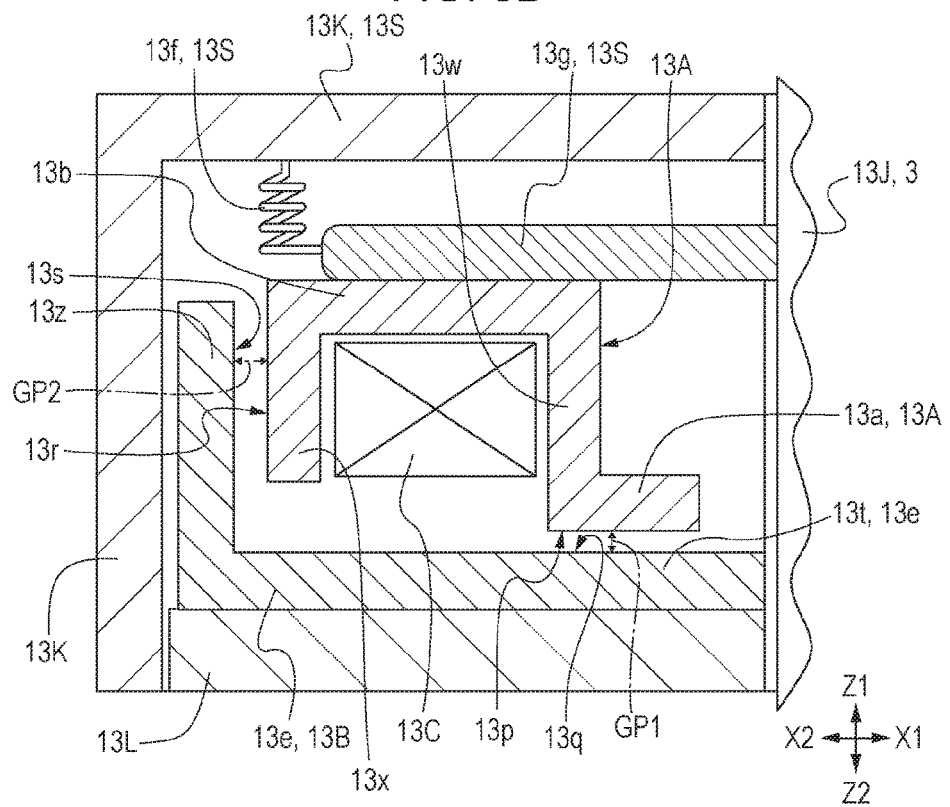
Figure 9A:
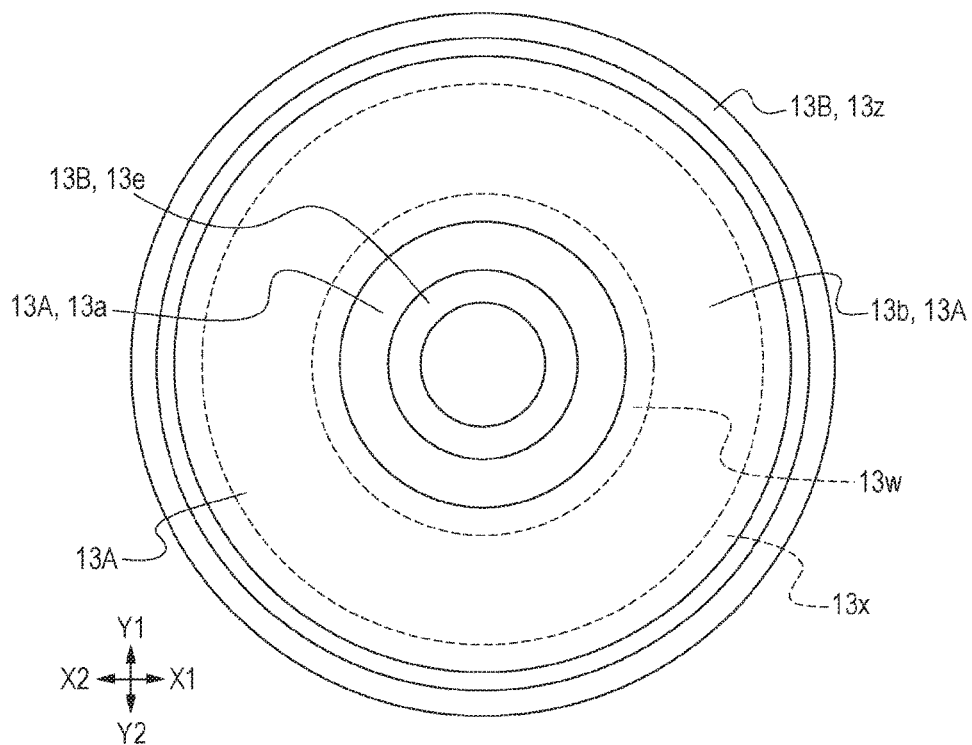
FIGS. 9A and 9B schematically illustrate the vibration generating member in the vibration generating device according to the first embodiment of the present invention, FIG. 9A being a top view illustrating a first yoke and a second yoke in the vibrating body in the vibration generating member, FIG. 9B being a side view of the first yoke and second yoke as viewed from the Y2 side indicated in FIG. 9A.
Figure 9B:
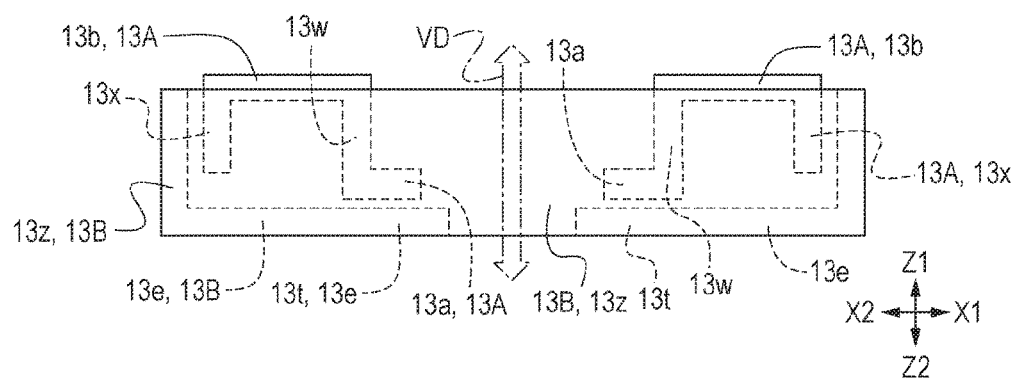
Figure 11A:
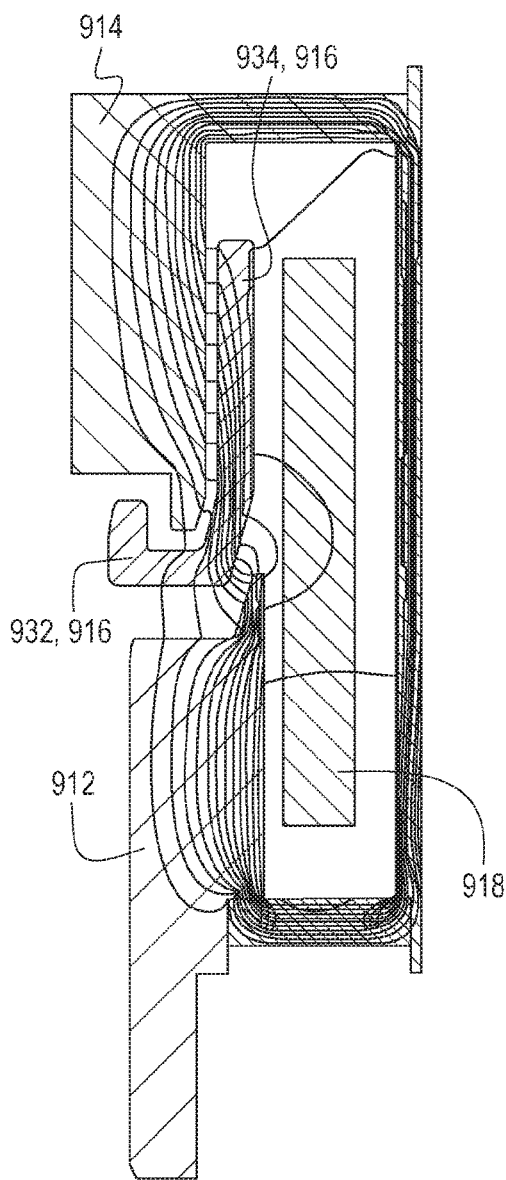
FIGS. 11A and 11B illustrate magnetic path analysis results indicating the effect of the actuator portion in the electromagnetic actuator in the conventional example, FIG. 11A being a magnetic flux line diagram in an initial state, FIG. 11B being a magnetic flux line diagram in a state in which a current is supplied to a coil.
Figure 11B:
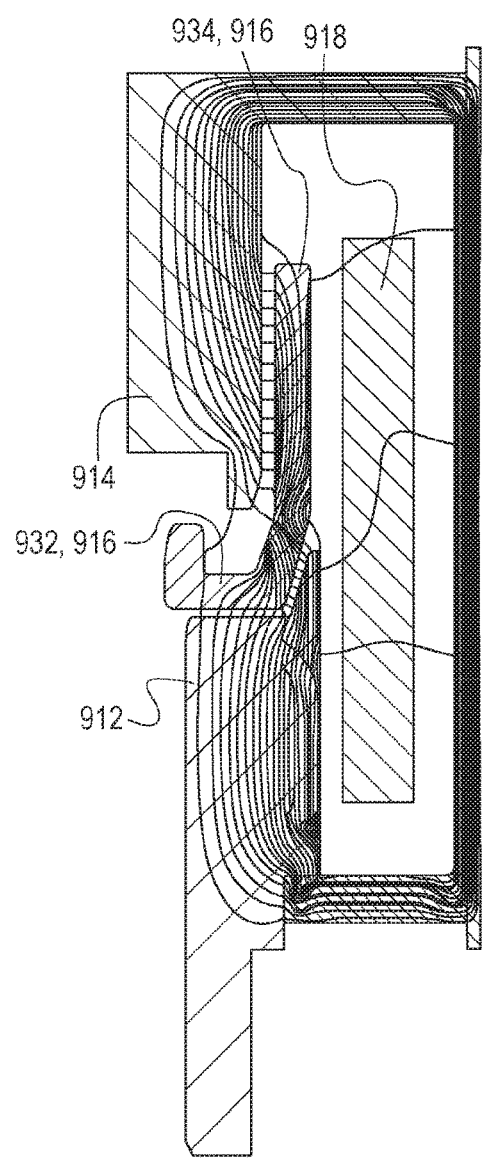

First, the vibration generating member 3 in the vibration generating device VB3 will be described. FIGS. 8A and 8B schematically illustrate the vibration generating member 3; FIG. 8A is a cross-sectional view of the vibrating body 13 illustrated in FIG. 7, and FIG. 8B is an enlarged view of a portion IIIVB indicated in FIG. 8A. FIGS. 9A and 9B schematically illustrate the vibrating body 13 in the vibration generating member 3; FIG. 9A is a top view illustrating a first yoke 13A and a second yoke 13B in the vibrating body 13, and FIG. 9B is a side view of the first yoke 13A and second yoke 13B as viewed from the Y2 side indicated in FIG. 9A.

As illustrated in FIG. 6, the vibration generating member 3 includes the vibrating body 13 that has the movable part 13J operable in the vibration direction VD, a control unit 33 that controls the vibrating body 13, and flexible printed circuits (FPC) (not illustrated) that electrically connect the vibrating body 13 and control unit 33 together.

As illustrated in FIGS. 8A and 8B, the vibrating body 13 in the vibration generating member 3 includes the movable part 13J operable in the vibration direction VD (X direction illustrated in FIG. 5), the first yoke 13A and second yoke 13B, which are placed so as to be spaced in the pressing direction PD, a coil 13C placed in the vicinity of the first yoke 13A, and support bodies 13S (in FIGS. 8A and 8B, spring members 13f and support plates 13g) that support the first yoke 13A so as to be movable in the vibration direction VD. Besides, in the first embodiment of the present invention, the vibrating body 13 has a main body case 13K, which is in a cylindrical shape, accommodates the first yoke 13A, second yoke 13B, coil 13C, and the like as illustrated in FIG. 6, and also has a main body cover 13L that covers the lower side (on the same side as the Z2 direction indicated in FIGS. 8A and 8B) of the main body case 13K as illustrated in FIG. 8A. When a current is supplied to the coil 13C, magnetic paths are formed in the first yoke 13A and second yoke 13B and a magnetic attractive force is generated between the first yoke 13A and the second yoke 13B.

The movable part 13J of the vibrating body 13, which is manufactured from a metal material such as iron, is placed so as to pass through the central portion of the main body case 13K as illustrated in FIG. 6. The movable part 13J moves so as to be able to reciprocate along the vibration direction VD in response to a driving signal applied to the vibrating body 13. The movable part 13J can reciprocate in the pressing direction PD (matching the vibration direction VD) in response to a pressing manipulation by the user as well.

As illustrated in FIG. 7, the upper side (Z1 side indicated in FIG. 7) of the movable part 13J is fixed to the top surface 15t of the vibration transmitting member 5 by a first holding plate 16 and a second holding plate 26, which will be described later, connecting the movable part 13J to the vibration transmitting member 5. Thus, the operation of the movable part 13J in the vibration direction VD is transmitted to the vibration transmitting member 5.

The first yoke 13A of the vibrating body 13 is manufactured from a soft magnetic material such as iron. As indicated in FIG. 9A, the first yoke 13A has a first flat plate part 13a in a ring shape, its outside shape being circular in a plan view, its central portion being a circular opening, and also has a second flat plate part 13b in a ring shape, which is formed outside the first flat plate part 13a. As illustrated in FIGS. 8A and 8B, the first yoke 13A has an inner wall part 13w extending perpendicularly from the inner end of the second flat plate part 13b (in FIGS. 8A and 8B, the inner wall part 13w extends in the Z1 direction), and also has an outer wall part 13x extending perpendicularly from the outer end of the second flat plate part 13b. As indicated in FIGS. 8A and 8B, the first yoke 13A has a U-shaped cross section formed by the second flat plate part 13b, inner wall part 13w, and outer wall part 13x.

As illustrated in FIGS. 8A and 8B, the first yoke 13A is fixed to the support plate 13g of the support body 13S. This support plate 13g is supported to the main body case 13K by the spring member 13f of the support body 13S so as to be movable. Thus, the movement of the first yoke 13A in the vibration direction VD becomes possible.

Although not illustrated in detail, the support plate 13g is engaged with the movable part 13J, so the movement of the first yoke 13A in the vibration direction VD is transmitted through the support plate 13g to the movable part 13J. Although, in the first embodiment of the present invention, specific parts used as the support body 13S that supports the first yoke 13A so as to be movable in the vibration direction VD are omitted, these parts include the spring members 13f, support plates 13g, and main body case 13K.

The second yoke 13B of the vibrating body 13 is manufactured from a soft magnetic material such as iron, as with the first yoke 13A. As indicated in FIGS. 8A and 8B, the second yoke 13B has a flat plate part 13e in a ring shape, its outside shape being circular in a plan view, its central portion being a circular opening. As indicated in FIGS. 8A and 8B, the second yoke 13B has an outer wall part 13z extending perpendicularly from the outer end of the flat plate part 13e. As indicated in FIGS. 8A and 8B, the second yoke 13B has an L-shaped cross section formed by the flat plate part 13e and outer wall part 13z. As indicated in FIGS. 8A and 8B, the second yoke 13B is fixed to the main body cover 13L.

With the vibrating body 13 assembled, the first yoke 13A and second yoke 13B are spaced so as to face each other in the vibration direction VD, as illustrated in FIGS. 8A, 8B, and 9B. Therefore, the outer wall part 13x of the first yoke 13A and the outer wall part 13z of the second yoke 13B face each other, and the first flat plate part 13a of the first yoke 13A and the flat plate part 13e (this portion will be referred to be as the opposite flat plate part 13t) of the second yoke 13B face each other. The first yoke 13A and second yoke 13B are formed so that the size of the outside shape of the second yoke 13B is larger than the size of the outside shape of the first yoke 13A. Thus, the first flat plate part 13a, inner wall part 13w, and outer wall part 13x of the first yoke 13A are accommodated in the storage part defined by the flat plate part 13e and outer wall part 13z of the second yoke 13B. In this case, the first yoke 13A and second yoke 13B are placed so that their central positions match.

As described above, the outside shapes of the first yoke 13A and second yoke 13B are circular in a plan view. Therefore, even if their mutual positional relationship is slightly deviated from a desired positional relationship due to tolerances in part manufacturing and the like, deviation in a particular direction is lessened, so vibration with less eccentricity can be obtained.

After the first yoke 13A and second yoke 13B with a structure as described above has been assembled, the first flat plate part 13a of the first yoke 13A has a first vibration-side opposite surface 13p, which faces the opposite flat plate part 13t of the second yoke 13B in the vibration direction VD, and the opposite flat plate part 13t of the second yoke 13B has a second vibration-side opposite surface 13q, which faces the first vibration-side opposite surface 13p.

In an orthogonal direction HD orthogonal to the vibration direction VD, the outer wall part 13x of the first yoke 13A has a first orthogonal-side opposite surface 13r, which faces the outer wall part 13z of the second yoke 13B in the orthogonal direction HD, and the outer wall part 13z of the second yoke 13B has a second orthogonal-side opposite surface 13s, which faces the first orthogonal-side opposite surface 13r.

In addition, as illustrated in FIG. 8B, a first gap GP1 is generated between the first vibration-side opposite surface 13p of the first yoke 13A and the second vibration-side opposite surface 13q of the second yoke 13B, and a second gap GP2 is generated between the first orthogonal-side opposite surface 13r of the first yoke 13A and the second orthogonal-side opposite surface 13s of the second yoke 13B. This first gap GP1 is formed so as to be narrower than the second gap GP2. Thus, when a current is supplied to the coil 13C, the magnetic attractive force between the first yoke 13A and second yoke 13B in the first gap GP1 becomes strong. Therefore, the first yoke 13A moves faster toward the second yoke 13B in the vibration direction VD in the first gap GP1, so the first yoke 13A vibrates in the vibration direction VD. Accordingly, it is possible for the vibration transmitting member 5 to give stronger vibration in the vibration direction VD to the input unit TP1 through the movable part 13J, which is operable in the vibration direction VD.

In addition, in the first embodiment of the present invention, the first vibration-side opposite surface 13p and second vibration-side opposite surface 13q are formed so as to have such areas that any one of the first vibration-side opposite surface 13p and second vibration-side opposite surface 13q covers the other. Therefore, even when the first yoke 13A moves in the vibration direction VD when a magnetic attractive force is generated, the first vibration-side opposite surface 13p and second vibration-side opposite surface 13q surely overlap, so a stable magnetic attractive force can be obtained.

Furthermore, in the first embodiment of the present invention, the first gap GP1 is provided over the entire circumference in the vibration direction VD, so a stronger magnetic attractive force between the first yoke 13A and the second yoke 13B can be obtained in a stable manner. Thus, it is possible to cause the first yoke 13A to vibrate even more strongly in the vibration direction VD in a stable manner.

In an initial state in which no magnetic attractive force is generated, the opposite areas of the first orthogonal-side opposite surface 13r and second orthogonal-side opposite surface 13s in the orthogonal direction HD are preferably larger than the opposite areas of the first vibration-side opposite surface 13p and second vibration-side opposite surface 13q in the vibration direction VD. Thus, when a current is supplied to the coil 13C, a magnetic resistance (the ease with which a magnetic flux flows) caused in the second gap GP2 n the magnetic circuit formed from the first yoke 13A and second yoke 13B can be reduced. Therefore, a magnetic resistance in the entire magnetic circuit can be reduced and the magnetic attractive force between the first yoke 13A and the second yoke 13B in the vibration direction VD (in the first gap GP1) can thereby be made stronger. Accordingly, the first yoke 13A moves even faster toward the second yoke 13B in the vibration direction VD. Therefore, it is possible for the vibration transmitting member 5 to give even stronger vibration through the movable part 13J, which is operable in the vibration direction VD.

In addition, in the first embodiment of the present invention, for the first orthogonal-side opposite surface 13r of the outer wall part 13x and the second orthogonal-side opposite surface 13s of the outer wall part 13z, which are formed in the initial state in which no magnetic attractive force is generated, the outer wall part 13x, of the first yoke 13A, that is not opposite to the outer wall part 13z is formed in a direction (Z1 direction indicated in FIG. 8) opposite to the direction (Z2 direction indicated in FIG. 8) in which the first yoke 13A moves and the outer wall part 13z, of the second yoke 13B, that is not opposite to the outer wall part 13x is formed in the direction in which the first yoke 13A moves.

Thus, when a magnetic attractive force is generated and the first yoke 13A moves, the outer wall part 13x (on the same side as the end of the second flat plate part 13b) that is not opposite to the outer wall part 13z of the second yoke 13B in the initial state becomes opposite to the outer wall part 13z of the second yoke 13B, and the outer wall part 13z (on the same side as the end of the flat plate part 13e) that is not opposite to the outer wall part 13x of the first yoke 13A in the initial state becomes opposite to the outer wall part 13x of the first yoke 13A. That is, when a magnetic attractive force is generated, the opposite areas of the first orthogonal-side opposite surface 13r and the second orthogonal-side opposite surface 13s are preferably increased. Therefore, the area of a portion that has an effect of mainly inducing a magnetic flux is increased, so the magnetic resistance in this portion is reduced in contrary to the fact that the opposite areas of the second fixed iron core 914 and magnetic flux inducing part 934 are reduced and the magnetic resistance is thereby increased as in the conventional example. Thus, the magnetic attractive force between the first yoke 13A and the second yoke 13B in the first gap GP1 becomes even stronger, making it possible to give even stronger vibration.

The control unit 33, which uses an integrated circuit (IC), in the vibration generating member 3 is mounted on the wiring board 90 as illustrated in FIG. 6. The control unit 33 transmits a driving signal to the vibrating body 13 in response to a command signal according to the input manipulation on the input unit TP1 connected to the vibration generating device VB3.

The flexible printed circuits (FPC) in the vibration generating member 3 uses a film base material, based on a polyimide (PI) resin, which is generally in widespread use. One end of the FPC is connected to the vibrating body 13, and the other end is connected to the control unit 33 through a connector CN illustrated in FIG. 6.

Next, the base body 4 in the vibration generating device VB3 will be described. The base body 4 is manufactured by injecting a synthetic resin such as an ABS resin. As illustrated in FIG. 6, the base body 4 includes a base part 14 in a box shape, the base part 14 being open on the lower side (on the same side as the Z2 direction indicated in FIG. 6) (see FIG. 7), and also includes outer circumferential wall parts 24, which are connected to the base part 14 on the lower side (see FIG. 7) and enclose the outer circumference of the base part 14.

The base part 14 in the base body 4 includes an upper wall part 14t in a substantially square shape, side wall parts 14w extending downward from the four edges of the upper wall part 14t, and linkage parts 14r (see FIG. 7) that link the base part 14 and outer circumferential wall parts 24 together. The side wall parts 14w of the base part 14 and the outer circumferential wall parts 24 form groove parts 4m.

The upper wall part 14t of the base part 14 has a circular through-hole 14h at the central portion and also includes three protrusions 14s extending upward from the upper wall part 14t. With the vibration generating device VB3 assembled, the movable part 13J of the vibration generating member 3 is inserted into this circular through-hole 14h and, although not illustrated in detail, the main body case 13K of the vibrating body 13 is accommodated in an accommodating part 14c inside the base part 14, as illustrated in FIG. 7. The main body case 13K of the vibrating body 13 is fixed to the inside of the upper wall part 14t with screws or the like, holding the vibration generating member 3 to the base body 4. The urging members 7 are placed on the upper wall part 14t.

Next, the top plate member 40 in the vibration generating device VB3 will be described. The top plate member 40 is manufactured in a rectangular plate shape by injecting a synthetic resin such as an ABS resin. The top plate member 40 has a circular through-hole 40h at the central portion as illustrated in FIG. 6, and also has restricting parts 40t protruding downward from the lower surface at positions at which they enclose the through-hole 40h as illustrated in FIG. 7. The lower surface of the top plate member 40 and the protrusions 14s of the base body 4 are bonded or welded together, integrally fixing the top plate member 40 to the base body 4.

Next, the vibration transmitting member 5 in the vibration generating device VB3 will be described. The vibration transmitting member 5 is manufactured by injecting a synthetic resin such as an ABS resin. As illustrated in FIG. 6, the vibration transmitting member 5 includes a base part 15 in a box shape, which is open on the lower side (see FIG. 7), and a placement part 25, which is formed along the outer circumference of the upper surface side of the base part 15 so as to protrude upward.

As illustrated in FIG. 6, the base part 15 in the vibration transmitting member 5 includes a top surface 151 in a substantially square shape and side walls 15w extending downward from the four edges of the top surface 151. With the vibration generating device VB3 assembled, as illustrated in FIG. 7, the side walls 15w of the base part 15 are inserted into the groove parts 4m in the base body 4 and the vibration transmitting member 5 is disposed with space left around it, the spacing being enough for the vibration transmitting member 5 to movable in the vibration direction VD.

As illustrated in FIG. 6, the top surface 15t of the base part 15 has a first hole part 15h, which is circular, at the central portion and also has three second hole parts 15k at positions corresponding to the protrusions 14s of the base body 4. With the vibration generating device VB3 assembled, as illustrated in FIG. 7, the movable part 13J in the vibration generating member 3 is inserted into the first hole part 15*h* and the protrusions 14*s* of the base part 14 in the base body 4 are inserted into the second hole parts 15*k*.

As described above, the top surface 15*t* is sandwiched by the first holding plate 16 and second holding plate 26 and is tightened with a nut NT. Therefore, the vibration transmitting member 5 and movable part 13J are connected together and are fixed. Thus, the operation of the movable part 13J in the vibration direction VD is transmitted to the vibration transmitting member 5.

As illustrated in FIG. 6, the placement part 25 in the vibration transmitting member 5 extends upward from the upper surface side of the base part 15 and is formed in a frame shape along the outer circumference of the base part 15. Although not illustrated in detail, the input unit TP1 is placed on this placement part 25 and is fixed to it as illustrated in FIG. 1. Thus, since the vibration generating device VB3 described above is used, when the manipulation surface TPp of the input unit TP1 is manipulated with the specific body region F99 such as a user's fingertip, strong vibration is given to the input unit TP1. Therefore, it is possible to provide the manipulation feeling imparting input device 101 with which a stronger manipulation feeling is imparted without having to supply much more current to the coil 13C to generate a large magnetic field.

Since, in the first embodiment of the present invention, the input unit TP1 is connected integrally to the placement part 25, vibration generated by the vibration generating device VB3 is efficiently transmitted directly to the input unit TP1. Therefore, even when the volumes of the first yoke 13A and second yoke 13B are reduced or the coil 13C is downsized, vibration generated by the vibration generating device VB3 is efficiently transmitted to the input unit TP1, so it is possible to downsize the vibration generating device VB3 without a manipulation feeling being impaired.

Next, the urging member 7 in the vibration generating device VB3 will be described. As illustrated in FIG. 6, the urging members 7 use four general coil springs. As illustrated in FIG. 7, the urging members 7 are placed between the upper wall part 14*t* of the base body 4 and the top surface 15*t* of the vibration transmitting member 5, and urge the vibration generating member 3 and vibration transmitting member 5 in directions away from each other. Since a coil spring is used as the urging member 7, the urging member 7 can be deformed in the vibration direction VD (Z direction indicated in FIG. 6). This allows the vibration transmitting member 5 to move in the vibration direction VD. The urging member 7 is not limited to a coil spring; for example, magnets may be used. In this case, when a plurality of magnets are placed in the Z direction at the positions at which the urging members 7 are present in FIG. 7 so that identical poles face each other with space interposed, the repulsive forces of the magnets make it possible to support the input unit TP1 so as to be able to reciprocate in the vibration direction VD.

Finally, the wiring board 90 in the vibration generating device VB3 will be described. As the wiring board 90, a generally-used double-sided PWB is used. As illustrated in FIG. 7, the wiring board 90 is accommodated in the accommodating part 14*c* inside the base part 14. Although not illustrated in detail, the wiring board 90 is fixed to the base body 4 with screws or the like. As illustrated in FIG. 6, the control unit 33 in the vibration generating member 3, the capacitance detecting part 91 in the input unit TP1, the connector CN, and the like are mounted on the wiring board 90.

Effects of the vibration generating device VB3, structured as described above, in the first embodiment of the present invention and the manipulation feeling imparting input device 101 using the vibration generating device VB3 will be compiled below.

With the vibration generating device VB3 in the first embodiment of the present invention, the first gap GP1 formed in the in the vibration direction VD between the first vibration-side opposite surface 13*p* of the first yoke 13A and the second vibration-side opposite surface 13*q* of the second yoke 13B is narrower than the second gap GP2 formed in the orthogonal direction HD between the first orthogonal-side opposite surface 13*r* of the first yoke 13A and the second orthogonal-side opposite surface 13*s* of the second yoke 13B. Therefore, when a current is supplied to the coil 13C, the magnetic attractive force between the first yoke 13A and second yoke 13B in the first gap GP1 becomes strong. Thus, the first yoke 13A moves faster toward the second yoke 13B in the vibration direction VD in the first gap GP1, so the first yoke 13A vibrates in the vibration direction VD. Therefore, it is possible for the vibration transmitting member 5 to give stronger vibration in the vibration direction VD through the movable part 13J, which is operable in the vibration direction VD. Therefore, it is possible to provide the vibration generating device VB3 that can give a stronger manipulation feeling without having to supply much more current to the coil 13C to generate a large magnetic field.

Moreover, the opposite areas of the first orthogonal-side opposite surface 13*r* and second orthogonal-side opposite surface 13*s* in the second gap GP2, which has a wider gap than the first gap GP1, are larger than the opposite areas of the first vibration-side opposite surface 13*p* and second vibration-side opposite surface 13*q* in the first gap GP1. Thus, when a current is supplied to the coil 13C, a magnetic resistance (the ease with which a magnetic flux flows) caused in the second gap GP2 in the magnetic circuit formed from the first yoke 13A and second yoke 13B can be reduced. Therefore, a magnetic resistance in the entire magnetic circuit can be reduced and the magnetic attractive force between the first yoke 13A and the second yoke 13B in the vibration direction VD (in the first gap GP1) thereby become stronger. Accordingly, the first yoke 13A moves even faster toward the second yoke 13B in the vibration direction VD. Therefore, it is possible for the vibration transmitting member 5 to give even stronger vibration through the movable part 13J, which is operable in the vibration direction VD.

When a magnetic attractive force is generated, the opposite areas of the first orthogonal-side opposite surface 13*r* and the second orthogonal-side opposite surface 13*s* are increased, so the area of a portion that has an effect of mainly inducing a magnetic flux is increased. Therefore, the magnetic resistance in this portion is reduced in contrary to the fact that the opposite areas of the second fixed iron core 914 and magnetic flux inducing part 934 are reduced and the magnetic resistance is thereby increased as in the conventional example. Thus, the magnetic attractive force between the first yoke 13A and the second yoke 13B in the first gap GP1 becomes even stronger, making it possible to give even stronger vibration.

Since the manipulation feeling imparting input device 101 in the first embodiment of the present invention uses the vibration generating device VB3 described above, when the manipulation surface TPp of the input unit TP1 is manipulated with the specific body region F99 such as a user's fingertip, strong vibration is given to the input unit TP1. Therefore, it is possible to provide the manipulation feeling imparting input device 101 with which a stronger manipulation feeling is imparted without having to supply much more current to the coil 13C to generate a large magnetic field.

Since the input unit TP1 is connected integrally to the vibration transmitting member 5 in the vibration generating device VB3, vibration generated by the vibration generating device VB3 is efficiently transmitted directly to the input unit TP1. Thus, an even stronger manipulation feeling is imparted to the input unit TP1.

The present invention is not limited to the embodiment described above. The present invention can also be practiced by, for example, making variations as described below. These forms of practice are also included in the technical range of the present invention.

First Variation

Although, in the first embodiment described above, the spring member 13*f* has been used as the support body 13S that supports the first yoke 13A so as to be movable in the vibration direction VD, the spring member 13*f* may not be used. In this case, the urging member 7 that allows the movement of the movable part 13J in the vibration direction VD through the vibration transmitting member 5 undertakes a function as a support body that supports the movement of the first yoke 13A engaged with the movable part 13J in the vibration direction VD.

Second Variation

Although, in the first embodiment described above, the coil 13C has been placed in the vicinity of the first yoke 13A, this is not a limitation. It suffices to place the coil 13C in the vicinity of at least one of the first yoke 13A and second yoke 13B.

Third Variation

Although, in the first embodiment described above, a capacitive touch pad has been preferably used as the input unit TP1, this is not a limitation. For example, a so-called touch panel that uses a translucent base material and translucent electrodes may be used. For example, a panel of a type that uses conductive-filler-bearing conductive patterns may be used as electrodes.

Fourth Variation

Although, in the first embodiment described above, the outside shapes of the first yoke 13A and second yoke 13B have been preferably circular in a plan view, this is not a limitation. For example, the outside shapes may be rectangular in a plan view. For example, the first yoke 13A and second yoke 13B may be provided independently of each other in the vibration direction VD.

Fifth Variation

Although, in the first embodiment described above, the X-coordinate detection layer 11, Y-coordinate detection layer 21, and insulating board 51 have been preferably manufactured by using a double-sided PWB, this is not a limitation. They may be manufactured by, for example, printing a conductive paste on both surfaces of a film base material and curing the paste. Alternatively, they may be manufactured by, for example, creating a transparent conductive film (such as, for example, a tin-doped indium oxide (ITO) film) on both surfaces of a glass base material.

Sixth Variation

In addition to the first embodiment above, a detection member that detects a pressing operation performed on the input unit TP1 may be provided. For example, a switch member such as a push switch or a sensor member such a pressure sensor or force sensor may be placed in the vicinity of the movable part 13J.

The present invention is not limited to the embodiment described above. The present invention can be appropriately modified without departing from the intended scope of the present invention.

What is claimed is:

1. A vibration generating device comprising:
a vibration generating member;
a vibration transmitting member connected to the vibration generating member; and
a base body that holds the vibration generating member, wherein the vibration generating member includes:
a movable part operable in a first direction which is a direction of vibration, the movable part being coupled to the vibration transmitting member;
a first yoke having:
a first surface orthogonal to the first direction; and
a second surface parallel to the first direction;
a second yoke facing the first yoke, the second yoke having:
a third surface orthogonal to the first direction, the third surface facing the first surface with a first gap provided therebetween; and
a fourth surface parallel to the first direction, the fourth surface facing the second surface with a second gap provided therebetween, the first gap being narrower than the second gap;
a coil disposed in a vicinity of at least one of the first yoke and the second yoke, the coil generating magnetism; and
a support body that movably supports the first yoke such that the first yoke vibrates in the first direction.

2. The vibration generating device according to claim 1, wherein, in an initial state in which no magnetic force is generated between the first yoke and the second yoke, an opposing area between the second surface and the fourth surface is greater than an opposing area between the first surface and the third surface.

3. The vibration generating device according to claim 1, wherein when a magnetic attractive force is generated between the first yoke and the second yoke, an opposing area between the second surface and the fourth surface increases.

4. An input device providing a manipulation feeling, the input device comprising:
the vibration generating device according to claim 1; and
an input unit connected to the vibration transmitting member of the vibration generating device, the input unit including:
a manipulation surface that is manipulated by an operating body; and
a control unit that processes and outputs manipulation information inputted on the manipulation surface, vibration being provided to the operating body when the manipulation surface is manipulated.

5. The input device according to claim 4, wherein the input unit is connected integrally to the vibration transmitting member.

6. The vibration generating device according to claim 1, wherein the first yoke and the second yoke are made of a soft magnetic material.

7. The vibration generating device according to claim 1, wherein the second yoke accommodates the first yoke, the second surface being an outer side surface of the first yoke, and the fourth surface being an inner side surface of the second yoke.

8. The vibration generating device according to claim 7, wherein the first surface is a lower bottom surface of the first yoke, and the third surface is an upper bottom surface of the second yoke.

9. The vibration generating device according to claim 2, wherein when a magnetic attractive force is generated between the first yoke and the second yoke, the opposing area between the second surface and the fourth surface increases, thereby reducing a magnetic resistance across the second gap so as to increase the magnetic attractive force between the first yoke and the second yoke across the first gap.

* * * * *